United States Patent
Winch et al.

(10) Patent No.: US 12,072,121 B2
(45) Date of Patent: Aug. 27, 2024

(54) AUTOMATED FILTER EXCHANGE APPARATUS

(71) Applicant: HAPPY LITTLE PIGS, LLC, Powell, OH (US)

(72) Inventors: Christopher A. Winch, Powell, OH (US); Danielle T. Winch, Powell, OH (US)

(73) Assignee: HAPPY LITTLE PIGS, LLC, Powell, OH (US)

( * ) Notice: Subject to any disclaimer, the term of this patent is extended or adjusted under 35 U.S.C. 154(b) by 685 days.

(21) Appl. No.: 17/360,094

(22) Filed: Jun. 28, 2021

(65) Prior Publication Data

US 2021/0404705 A1     Dec. 30, 2021

Related U.S. Application Data

(60) Provisional application No. 63/045,220, filed on Jun. 29, 2020.

(51) Int. Cl.
| | |
|---|---|
| *F24F 13/28* | (2006.01) |
| *F24F 11/39* | (2018.01) |
| *F24F 11/52* | (2018.01) |
| *F24F 11/58* | (2018.01) |
| *F24F 110/40* | (2018.01) |

(52) U.S. Cl.
CPC ............. *F24F 13/28* (2013.01); *F24F 11/39* (2018.01); *F24F 11/52* (2018.01); *F24F 11/58* (2018.01); *F24F 2110/40* (2018.01)

(58) Field of Classification Search
CPC .. F24F 13/28; F24F 11/39; F24F 11/52; F24F 11/58; F24F 2110/40; B01D 46/88
See application file for complete search history.

(56) References Cited

U.S. PATENT DOCUMENTS

| | | | | |
|---|---|---|---|---|
| 3,247,652 | A * | 4/1966 | Annas | F24F 8/108 55/483 |
| 3,626,668 | A * | 12/1971 | Cardiff | B03C 3/155 55/318 |
| 4,221,576 | A | 9/1980 | Phillips, Jr. | |
| 5,788,729 | A * | 8/1998 | Jurgensmeyer | B01D 46/12 55/506 |
| 7,151,264 | B2 * | 12/2006 | Ehlers, Sr. | B01D 53/007 250/373 |

(Continued)

*Primary Examiner* — Dung H Bui
(74) *Attorney, Agent, or Firm* — McNees Wallace & Nurick LLC

(57) ABSTRACT

An automated filter exchange apparatus is disclosed including a filtration chamber in fluid communication with the return ducting and the HVAC unit, the filtration chamber including a plurality of active filter stations, a filter storage chamber adjacent to the filtration chamber having a plurality of filter storage stations, each of the plurality of filter storage stations being paired with one of the active filter stations through an exchange aperture to define a plurality of exchange units each comprised of one of the plurality of active filter stations and one of the plurality of filter storage stations, and a plurality of carriages disposed in one of the plurality of exchange units and being configured and arranged to removably receive an HVAC filter and transition the HVAC filter between one of the plurality of filter storage stations and one of the plurality of active filter stations.

20 Claims, 2 Drawing Sheets

(56) References Cited

U.S. PATENT DOCUMENTS

| | | | |
|---|---|---|---|
| 8,048,186 B2* | 11/2011 | Mann | B01D 46/0031 |
| | | | 55/501 |
| 8,075,031 B2 | 12/2011 | Walker, Jr. | |
| 8,313,567 B2 | 11/2012 | Sullivan | |
| 8,647,405 B2* | 2/2014 | Gray, Jr. | B01D 46/0002 |
| | | | 55/506 |
| 8,657,096 B2 | 2/2014 | Sullivan | |
| 10,155,228 B1* | 12/2018 | Bratton | F24F 13/28 |
| 10,610,818 B2 | 4/2020 | Fox et al. | |
| 10,641,520 B2* | 5/2020 | Conrad | F24F 7/065 |
| 2010/0037574 A1* | 2/2010 | Weber | B01D 46/0009 |
| | | | 55/496 |
| 2010/0282076 A1* | 11/2010 | Fox | B01D 46/0086 |
| | | | 95/25 |
| 2019/0160408 A1* | 5/2019 | Huang | B01D 46/62 |
| 2020/0269171 A1* | 8/2020 | Vaidya | B01D 46/58 |
| 2021/0354068 A1* | 11/2021 | Rickerts | B01D 46/0091 |
| 2022/0143431 A1* | 5/2022 | Lee | A62B 7/10 |

* cited by examiner

AUTOMATED FILTER EXCHANGE APPARATUS

RELATED APPLICATIONS

This application claims the benefit of and priority to U.S. Provisional Patent Application No. 63/045,220, filed Jun. 29, 2020, entitled "Automated Filter Exchange Apparatus," which is hereby incorporated by reference in its entirety.

FIELD OF THE INVENTION

The present application describes automated filter exchange apparatuses. More particularly, the present application describes automated filter exchange apparatuses for use with central heating ventilation and air conditioning systems.

BACKGROUND OF THE INVENTION

Central heating ventilation and air conditioning ("HVAC") systems typically employ filter media for the purpose of removing dust, spores, allergens, and other indoor air pollution. As used herein, "HVAC" includes systems which only include a heating or furnace component as well as systems which only include an air conditioning unit. These filters must be replaced at fairly regular intervals in order for the HVAC system to function efficiently and to reduce strain on the HVAC system, thereby prolonging the life of the HVAC system. Changing HVAC air filters may inconvenient, and forgetting to change HVAC filters may have undesirable consequences, such as increased utility bills, less effective heating and cooling, and less effective removal of indoor air pollution.

There is a need for adaptations to reduce the frequency with which HVAC filters are replaced.

BRIEF DESCRIPTION OF THE INVENTION

In an exemplary embodiment, an automated filter exchange apparatus arranged and configured to be disposed between return ducting and an HVAC unit includes a filtration chamber in fluid communication with the return ducting and the HVAC unit, the filtration chamber including a plurality of active filter stations disposed sequentially from upstream to downstream, a first filter storage chamber adjacent to the filtration chamber, the first filter storage chamber including includes a plurality of filter storage stations, each of the plurality of filter storage stations being paired with one of the active filter stations through an exchange aperture to define a plurality of exchange units each comprised of one of the plurality of active filter stations and one of the plurality of filter storage stations, and a plurality of carriages, each of the plurality of carriages being disposed in one of the plurality of exchange units and being configured and arranged to removably receive an HVAC filter and transition the HVAC filter between one of the plurality of filter storage stations and one of the plurality of active filter stations.

BRIEF DESCRIPTION OF THE DRAWINGS

Features and advantages of the general inventive concepts will become apparent from the following description made with reference to the accompanying drawings, including drawings represented herein in the attached set of figures, of which the following is a brief description.

Figure 1:
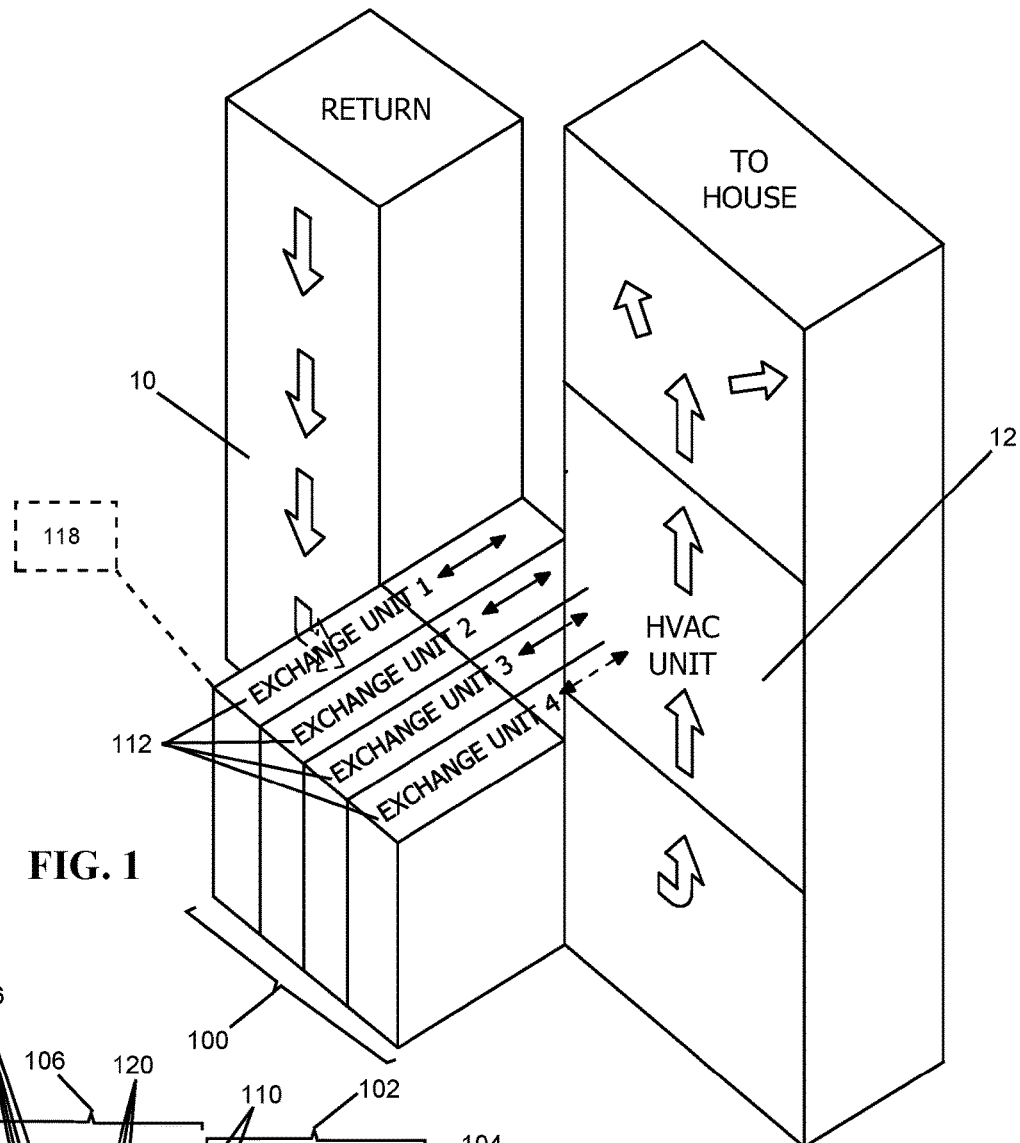
FIG. 1 is a schematic perspective view of an automated filter exchange apparatus, according to an embodiment of the present disclosure.
Figure 2:
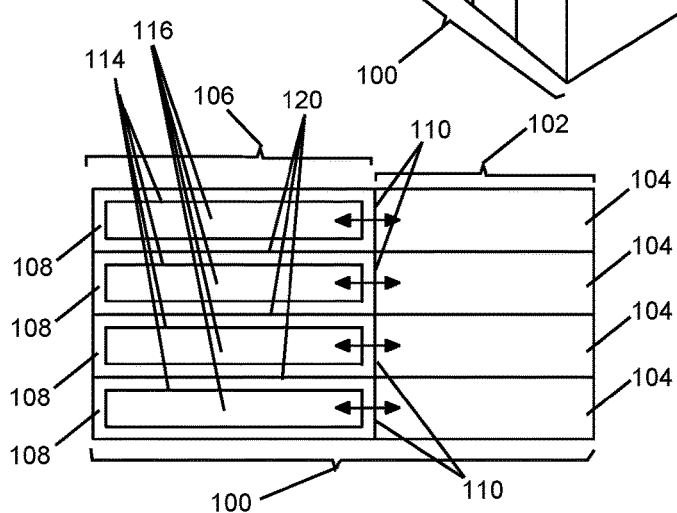
FIG. 2 is a top view of the automated filter exchange apparatus of FIG. 1, according to an embodiment of the present disclosure.
Figure 3:
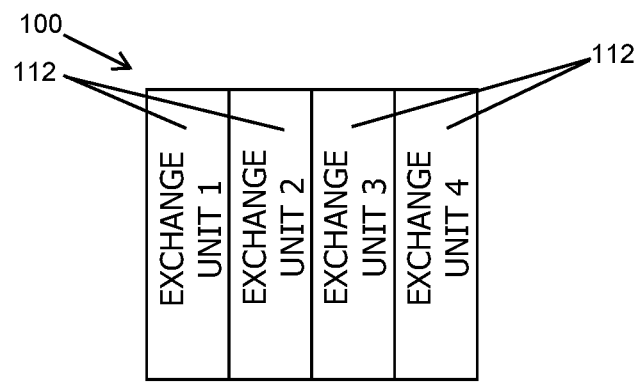
FIG. 3 is a side view of the automated filter exchange apparatus of FIG. 1, according to an embodiment of the present disclosure.

This disclosure describes exemplary embodiments in accordance with the general inventive concepts and is not intended to limit the scope of the invention in any way. Indeed, the invention as described in the specification is broader than and unlimited by the exemplary embodiments set forth herein, and the terms used herein have their full ordinary meaning.

DETAILED DESCRIPTION

Referring to FIGS. 1-4, in one embodiment an automated filter exchange apparatus 100 is arranged and configured to be disposed between return ducting 10 and an HVAC unit 12. The automated filter exchange apparatus 100 includes a filtration chamber 102 in fluid communication with the return ducting 10 and the HVAC unit 12, the filtration chamber 102 including a plurality of active filter stations 104 disposed sequentially from upstream to downstream. The automated filter exchange apparatus 100 further includes a first filter storage chamber 106 adjacent to the filtration chamber 102, the first filter storage chamber 106 including includes a plurality of filter storage stations 108, each of the plurality of filter storage stations 108 being paired with one of the active filter stations 104 through an exchange aperture 110 to define a plurality of exchange units 112 each comprised of one of the plurality of active filter stations 104 and one of the plurality of filter storage stations 108. The automated filter exchange apparatus 100 further includes a plurality of carriages 114, each of the plurality of carriages 114 being disposed in one of the plurality of exchange units 112 and being configured and arranged to removably receive an HVAC filter 116 and transition the HVAC filter 116 between one of the plurality of filter storage stations 108 and one of the plurality of active filter stations 104.

Figure 4:
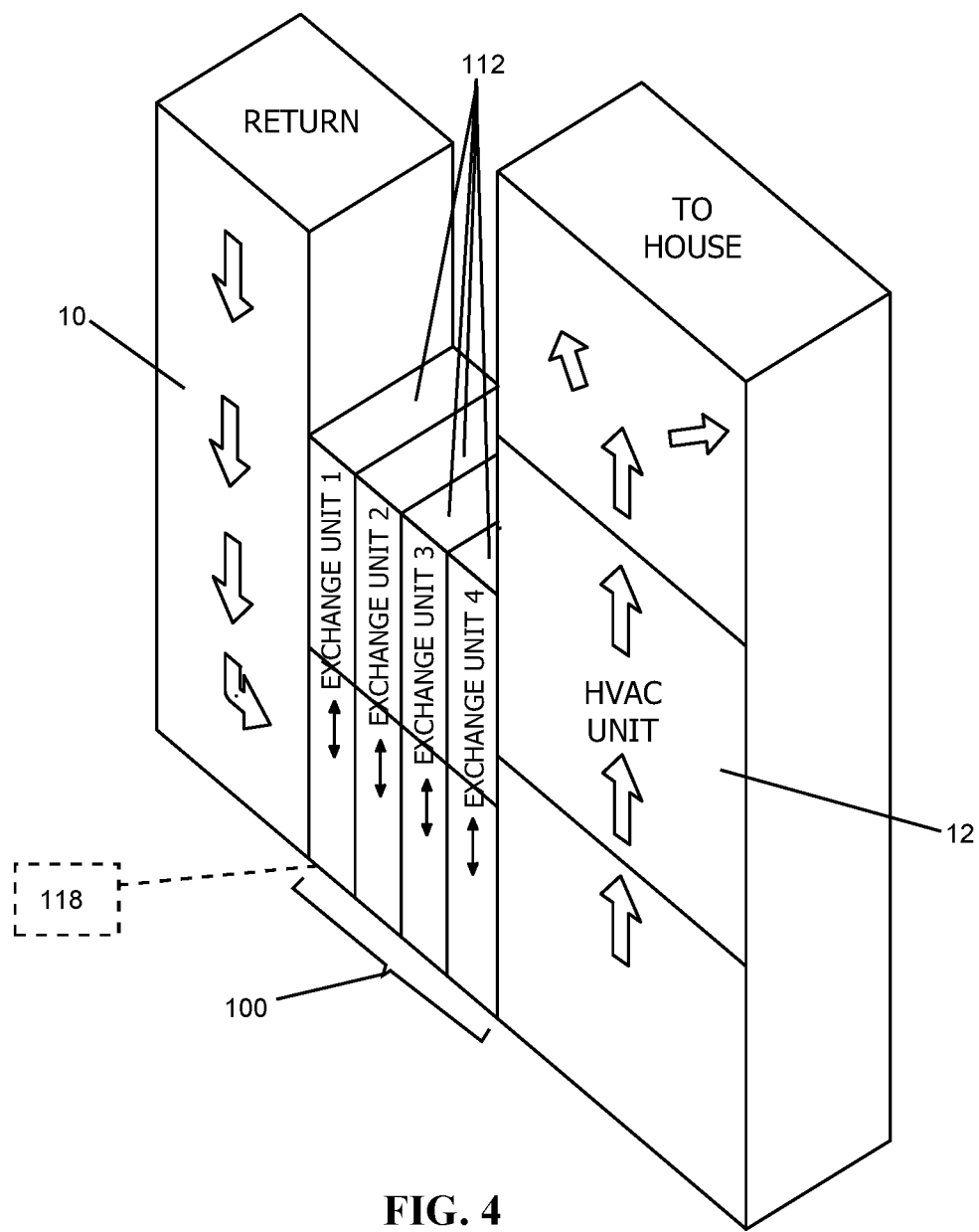
FIG. 4 is a schematic perspective view of an alternate configuration for the automated filter exchange apparatus of FIG. 1, according to an embodiment of the present disclosure.

In one embodiment, the first filter storage chamber 106 is disposed above the filtration chamber 102 (FIG. 4). In another embodiment, the first filter storage chamber 106 is disposed alongside the filtration chamber 102 (FIG. 1).

The HVAC filter 116 may include any suitable width, including, but not limited to, a width between 0.75 inches to 2.25 inches, a width between 3.75 inches to 4.25 inches, or a width between 4.75 inches to 5.25 inches.

The automated filter exchange apparatus 100 may include a control module 118 which transitions one of the plurality of carriages 114 from the first filter storage chamber 106 to the filtration chamber 102, and another of the plurality of carriages 114 from the filtration chamber 102 to the first filter storage chamber 106, thereby exchanging the HVAC filter 116. The control module 118 may programmable to exchange the HVAC filter 116 in a sequence proceeding through each of the exchange units 112. The exchange of the HVAC filter 116 may be based on a service life of the HVAC filter 116 according to a predetermined schedule or be based on sensor input measuring the pressure drop across the HVAC filter 116.

The plurality of exchange units 112 may include any suitable number of exchange units 112, including, but not limited to, at least two exchange units 112, at least three exchange units 112, at least four exchange units 112, or at least five exchange units 112.

Each of the plurality of carriages 114 may include any suitable translation mechanism, including, but not limited to, a metal sleeve engaged with a mechanical drive, a magnetic drive, a telescoping shaft, or combinations thereof.

The first filter storage chamber 106 may include a partition 120 disposed between each of the plurality of filter storage stations 108.

The automated filter exchange apparatus 100 may include a wi-fi module, a Bluetooth module, a z-wave module, or combinations thereof for connecting the automated filter exchange apparatus 100 to a home automation system or a mobile app through a control module 118. The home automation system or mobile app may monitor the automated filter exchange apparatus 100 remotely, receive notifications from the automated filter exchange apparatus 100, or issue commands to the automated filter exchange apparatus 100. In one embodiment, the automated filter exchange apparatus 100 issues a notification indicating that new HVAC filters 116 are due to be ordered or replaced in the automated filter exchange apparatus 100, or may order directly new HVAC filters 116 through an appropriate ordering service, such as, but way of example, when the last unused HVAC filter 116 is exchanged into use by the automated filter exchange apparatus 100, or at a predetermined time thereafter. The automated filter exchange apparatus 100 may also issue a notification if one of the plurality of carriages 114 does not function as intended, or if another fault requiring intervention occurs.

In one embodiment, the automated filter exchange apparatus 100 further includes a second filter storage chamber (not shown) adjacent to the filtration chamber 102, the second filter storage chamber including a further plurality of the filter storage stations 108 paired with one of the active filter stations 104 through a second exchange aperture to define a further plurality of exchange units 112 each comprised of one of the plurality of active filter stations 104 and one of the further plurality of filter storage stations 108 such that each of the plurality of active filter stations 104 is associated with two exchange units 112. The second filter storage chamber may be disposed across the filtration chamber 102 from the first filter storage chamber 106 or disposed orthogonal to the first filter storage chamber 106.

In a further embodiment, the automated filter exchange apparatus 100 may further include a third filter storage chamber (not shown) adjacent to the filtration chamber 102, the third filter storage chamber including a further plurality of the filter storage stations 108 paired with one of the active filter stations 104 through a third exchange aperture to define an additional plurality of exchange units 112 each comprised of one of the plurality of active filter stations 104 and one of the additional plurality of filter storage stations 108 such that each of the plurality of active filter stations 104 is associated with three exchange units 112, the second filter storage chamber being disposed across the filtration chamber 102 from the first filter storage chamber 106 and the third filter storage chamber being disposed orthogonal to the first filter storage chamber 106 and the second filter storage chamber.

As used herein, the singular forms "a," "an," and "the" are intended to include the plural forms as well, unless the context clearly indicates otherwise. The term "proximal" as used in connection with any object refers to the portion of the object that is closest to the operator of the object (or some other stated reference point), and the term "distal" refers to the portion of the object that is farthest from the operator of the object (or some other stated reference point). The term "about" indicates within 10% of the value being modified.

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed.

Those skilled in the art may readily adopt one or more of the inventive aspects, concepts and features into additional embodiments and uses within the scope of the general inventive concepts, even if such embodiments are not expressly disclosed herein. Additionally, even though some features, concepts and aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated.

Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. An automated filter exchange apparatus disposed between return ducting and an HVAC unit, comprising:
   a filtration chamber in fluid communication with the return ducting and the HVAC unit, the filtration chamber including a plurality of active filter stations disposed sequentially from upstream to downstream;
   a first filter storage chamber adjacent to the filtration chamber, the first filter storage chamber including includes a plurality of filter storage stations, each of the plurality of filter storage stations being paired with one of the active filter stations through an exchange aperture to define a plurality of exchange units each comprised of one of the plurality of active filter stations and one of the plurality of filter storage stations; and
   a plurality of carriages, each of the plurality of carriages being disposed in one of the plurality of exchange units and being configured and arranged to removably receive an HVAC filter and transition the HVAC filter between one of the plurality of filter storage stations and one of the plurality of active filter stations.

2. The automated filter exchange apparatus of claim 1, wherein the first filter storage chamber is disposed above the filtration chamber.

3. The automated filter exchange apparatus of claim 1, wherein the first filter storage chamber is disposed alongside the filtration chamber.

4. The automated filter exchange apparatus of claim 1, wherein the HVAC filter includes a width between 0.75 inches to 2.25 inches.

5. The automated filter exchange apparatus of claim 1, wherein the HVAC filter includes a width between 3.75 inches to 4.25 inches.

6. The automated filter exchange apparatus of claim 1, wherein the HVAC filter includes a width between 4.75 inches to 5.25 inches.

7. The automated filter exchange apparatus of claim 1, further including a control module which transitions one of the plurality of carriages from the first filter storage chamber to the filtration chamber, and another of the plurality of carriages from the filtration chamber to the first filter storage chamber, thereby exchanging the HVAC filter.

8. The automated filter exchange apparatus of claim 7, wherein in the control module is programmable to exchange the HVAC filter in a sequence proceeding through each of the exchange units.

9. The automated filter exchange apparatus of claim 8, wherein the exchange of the HVAC filter is based on a service life of the HVAC filter according to a predetermined schedule.

10. The automated filter exchange apparatus of claim 8, wherein the exchange of the HVAC unit is based on sensor input measuring the pressure drop across the HVAC filter.

11. The automated filter exchange apparatus of claim 1, wherein the plurality of exchange units includes at least three exchange units.

12. The automated filter exchange apparatus of claim 1, wherein the plurality of exchange units includes at least four exchange units.

13. The automated filter exchange apparatus of claim 1, wherein each of the plurality of carriages includes a metal sleeve engaged with a mechanical drive.

14. The automated filter exchange apparatus of claim 1, further including a wi-fi module, a Bluetooth module, a z-wave module, or combinations thereof for connecting the automated filter exchange apparatus to a home automation system or mobile app through a control module.

15. The automated filter exchange apparatus of claim 14, wherein the automated filter exchange apparatus is configured to issue a notification to the home automation system or the mobile app indicating that the HVAC filter is due to be ordered or replaced in the automated filter exchange apparatus.

16. The automated filter exchange apparatus of claim 1, further including a second filter storage chamber adjacent to the filtration chamber, the second filter storage chamber including includes a further plurality of the filter storage stations paired with one of the active filter stations through a second exchange aperture to define a further plurality of exchange units each comprised of one of the plurality of active filter stations and one of the further plurality of filter storage stations such that each of the plurality of active filter stations is associated with two exchange units.

17. The automated filter exchange apparatus of claim 16, wherein the second filter storage chamber is disposed across the filtration chamber from the first filter storage chamber.

18. The automated filter exchange apparatus of claim 16, wherein the second filter storage chamber is disposed orthogonal to the first filter storage chamber.

19. The automated filter exchange apparatus of claim 16, further including a third filter storage chamber adjacent to the filtration chamber, the third filter storage chamber including includes a further plurality of the filter storage stations paired with one of the active filter stations through a third exchange aperture to define an additional plurality of exchange units each comprised of one of the plurality of active filter stations and one of the additional plurality of filter storage stations such that each of the plurality of active filter stations is associated with three exchange units, the second filter storage chamber being disposed across the filtration chamber from the first filter storage chamber and the third filter storage chamber being disposed orthogonal to the first filter storage chamber and the second filter storage chamber.

20. The automated filter exchange apparatus of claim 1, wherein the first filter storage chamber includes a partition disposed between each of the plurality of filter storage stations.

* * * * *